United States Patent [19]

Orr, Jr. et al.

[11] 3,850,040

[45] Nov. 26, 1974

[54] SORPTION ANALYSIS APPARATUS AND METHOD

[75] Inventors: Clyde Orr, Jr., Atlanta; Warren P. Hendrix, Lawrenceville; Ronnie W. Camp, Norcross, all of Ga.; Paul D. Coulter, Strongsville, Ohio

[73] Assignee: Micromeritics Instrument Corporation, Norcross, Ga.

[22] Filed: Aug. 17, 1972

[21] Appl. No.: 281,276

[52] U.S. Cl. .................................. 73/432 PS, 73/38
[51] Int. Cl. ............................................ G01n 15/08
[58] Field of Search .......................... 73/432 PS, 38

[56] References Cited
UNITED STATES PATENTS

| | | | |
|---|---|---|---|
| 3,262,319 | 7/1966 | Orr, Jr. et al. | 73/432 PS |
| 3,349,625 | 10/1967 | Benusa et al. | 73/432 PS |
| 3,464,273 | 9/1969 | Hendrix et al. | 73/432 PS |
| 3,500,675 | 3/1970 | Sandstede et al. | 73/432 PS X |
| 3,555,912 | 1/1971 | Lowell | 73/432 PS |
| 3,707,870 | 1/1973 | Herve et al. | 73/38 |
| 3,732,736 | 5/1973 | Glaude et al. | 73/432 PS |

OTHER PUBLICATIONS

Kremen, J., et al.: A New Approach to Surface Area Determinations by Selective Gas Adsorption in a Nitrogen–Helium System. Paper No. 110 delivered at the Pittsburgh Conference on Analytical Chemistry and Applied Spectroscopy, Mar. 1–5, 1965, p. 1–16.

*Primary Examiner*—Jerry W. Myracle
*Assistant Examiner*—Joseph W. Roskos
*Attorney, Agent, or Firm*—Jones, Thomas & Askew

[57] ABSTRACT

Gaseous sorption analysis apparatus and method for the measurement at cryogenic temperatures of factors such as surface area, adsorption isotherms, and desorption isotherms. The disclosed system determines the dead space within a sample container and then adds to the evacuated container an initial dose of an operating gas, such as nitrogen, which is equal to the known dead space and other constant volumetric factors plus an additional increment of gas corresponding to a first estimated amount of gas to be adsorbed by the sample. The amount of gas actually adsorbed by the sample is determined, and this amount is used to determine the incremental amount of gas to be included in a second dose of gas applied to the sample for adsorption. Subsequent doses of gas are applied to the sample as required to bring the total amount of gas adsorbed up to a level which is a predetermined fraction of the gas saturation pressure of the sample at a fixed temperature. The foregoing steps are repeated a plurality of time to obtain a corresponding plurality of fixed points from which the BET curve is determinable for the particular sample. Since the individual dosages of gas are determined by the extent of adsorption incurred with previous gas doses, rather than by a fixed predetermined amount of gas dosage, the present method and apparatus does not require fixed, repeatable gas dosages for operation. The sample pumpdown rate is carefully controlled to avoid drawing the sample into the vacuum system of the present apparatus. Critical valving and other fluid passages are designed for closely maintainable thermal stability and volumetric precision. A nitrogen transfer system automatically maintains a predetermined desired level of nitrogen in a Dewar surrounding the samples being evaluated.

38 Claims, 7 Drawing Figures

SORPTION ANALYSIS APPARATUS AND METHOD

This invention relates in general to measurement apparatus and methods and in particular to improved gaseous sorption apparatus and method for measuring such factors as surface area and pore volume of material samples.

In the field of physical chemistry and in both scientific and industrial applications, it is frequently necessary to determine the surface area and/or the pore volume of a substance such as a granular or powdery material. Since the surface area and pore volume of such substances cannot be measured directly, the desired measurements generally are made through the prior-art technique of placing a monomolecular layer of gas on the surface of a material sample, measuring the amount of gas required, and then calculating the amount of area which a monomolecular layer of the measured amount of gas will cover. In the case of surface porosity measurements, the desired pore volume measurement generally is computed from a measured determination of the volume of gas required to substantially completely fill the surface cracks, crevices, and/or pores of the sample with a layer of gas. This porosity measurement may be obtained by subjecting the material sample to incrementally-increasing volumes of gas to a point at or approaching the saturation pressure of the particular gas, to yield what is known as an adsorption isotherm. A reversal of the foregoing procedure by subjecting the sample to incremental reductions in gas pressure, while noting the corresponding reduction in volumes and pressures of the gas, yields what is known as a desorption isotherm. As is known to those skilled in the art, adsorption and desorption isotherms coincide only when the solid is completely nonporous and there are no contact points among particles creating the effect of pores. Further explanation of prior art apparatus and techniques for measuring surface area and pore volume may be had by reference to U.S. Pat. Nos. 3,262,319 and 3,464,273, by way of example.

The gaseous sorption apparatus and techniques of the prior art generally require applying (or withdrawing) the requisite increments of gas in discrete, volumetrically-predetermined "doses" or quantities to a sample of the material undergoing examination, followed by allowing a predetermined amount of time for the gas surrounding the sample to be adsorbed (or desorbed) to a state of equilibrium whereat the equilibrium pressure could be measured. Additional predetermined doses of gas would then be added (or withdrawn) as necessary.

The foregoing apparatus and techniques of the prior art have proven to be unsatisfactory for a number of reasons. If such measurements are to have any quantitative meaning, the predetermined discrete increments of gas must be of a precisely determined, repeatable volume, thereby requiring apparatus and instrumentation capable of repeatably supplying (or withdrawing) the necessary incremental volumes of gas. Furthermore, the requirement that equilibrium pressure be obtained in the gas surrounding the material samples, following each addition or withdrawal of gas, means that substantial amounts of time are expended merely waiting for the preset equilibrium times to elapse. For the foregoing and other reasons, moreover, the gaseous sorption apparatus and techniques of the prior art have not proven readily adaptable to automatic or mechanized operation by the application of process control techniques under the command of a computer or otherwise, and so such prior art apparatus and techniques have involved considerable operator time, a major portion of which is spent in waiting for equilibration to occur.

Accordingly, it is an object of the present invention to provide an improved apparatus and method for gaseous sorption analysis.

It is another object of the present invention to provide gaseous sorption analysis apparatus and method which does not require the manipulation of gas doses in predetermined, discrete volumes.

It is yet another object of the present invention to provide a gaseous sorption analysis apparatus and method wherein the incremental doses of gas are determined as a function of the amount of gas which a material sample has previously adsorbed or desorbed.

It is a further object of the present invention to provide a gaseous sorption analysis apparatus and method which more readily lends itself to programmed control.

Other objects as well as many of the attendent advantages of the present invention will becomes more readily apparent from the following description of a preferred embodiment of this invention, said description including the following Figures, wherein.

Figure 3:
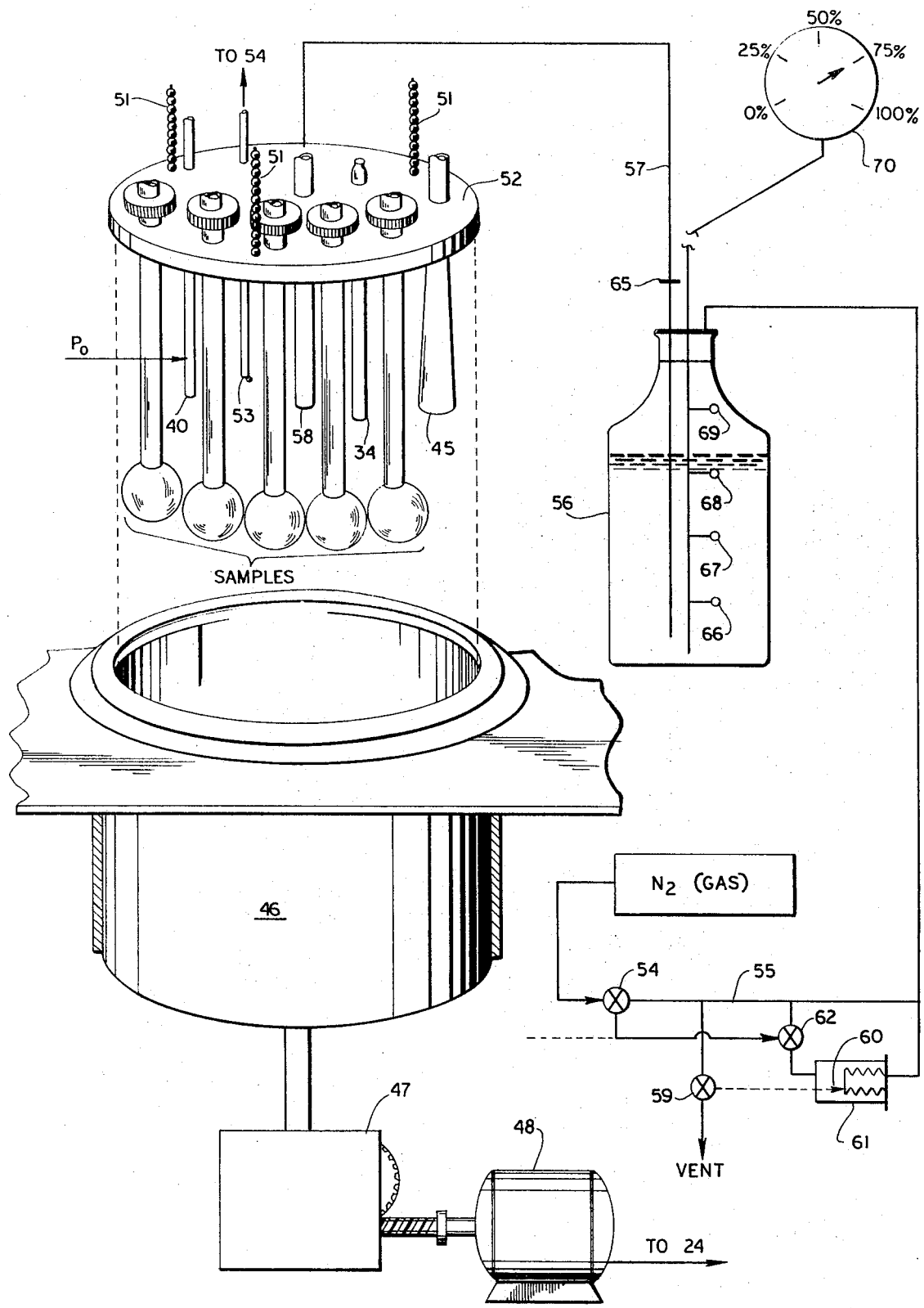
Figure 4:
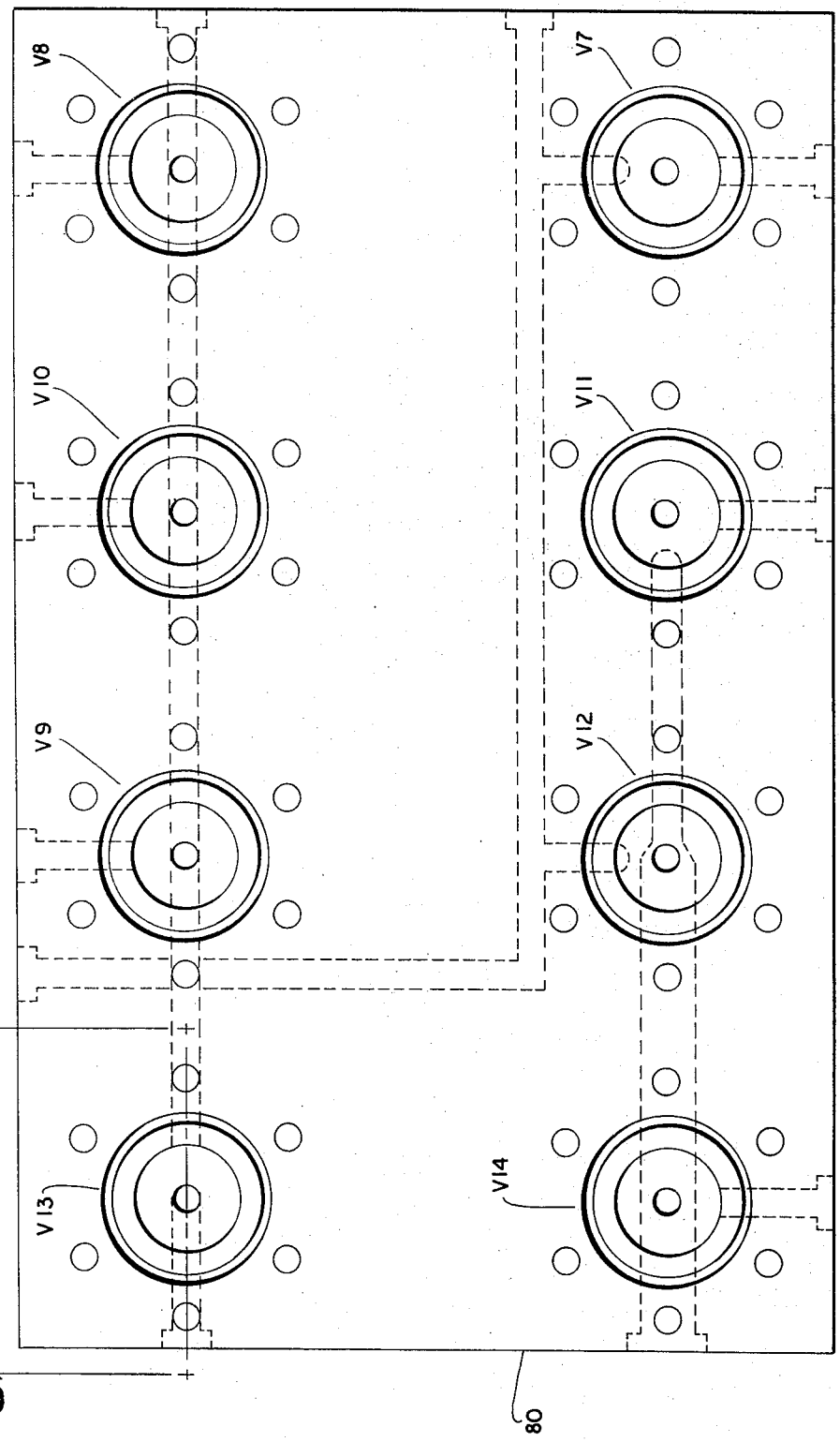
Figure 5A:
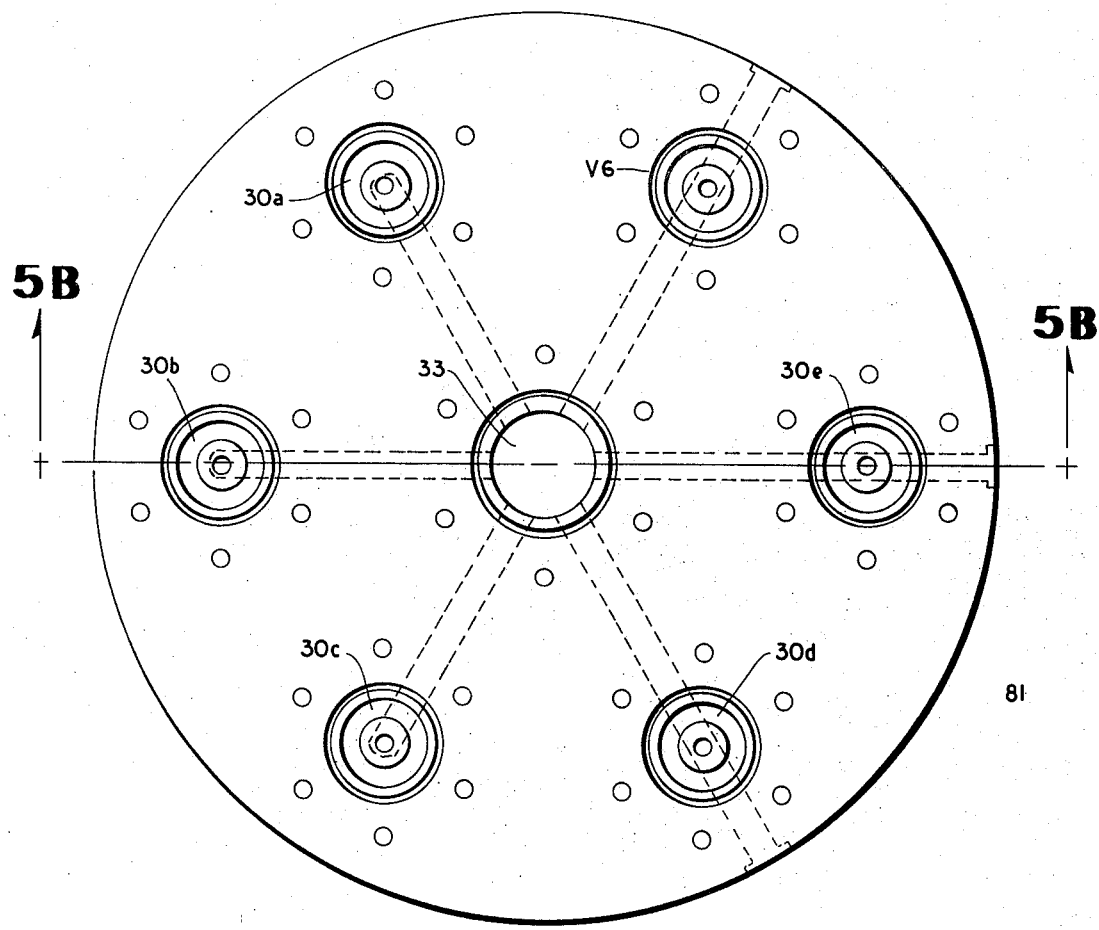
Figure 5B:
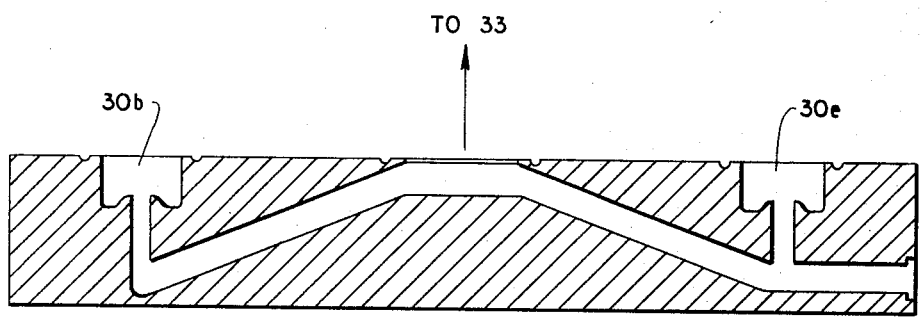

FIG. 3 schematically shows an embodiment of the liquid nitrogen environmental control system according to the disclosed embodiment;

FIG. 4 shows a plan view of the control valve assembly of the disclosed embodiment;

FIG. 5A shows a plan view of the sample valve assembly of the disclosed embodiment;

FIG. 5B is a section view taken along line 5B-5B of FIG. 5A; and

Figure 6:
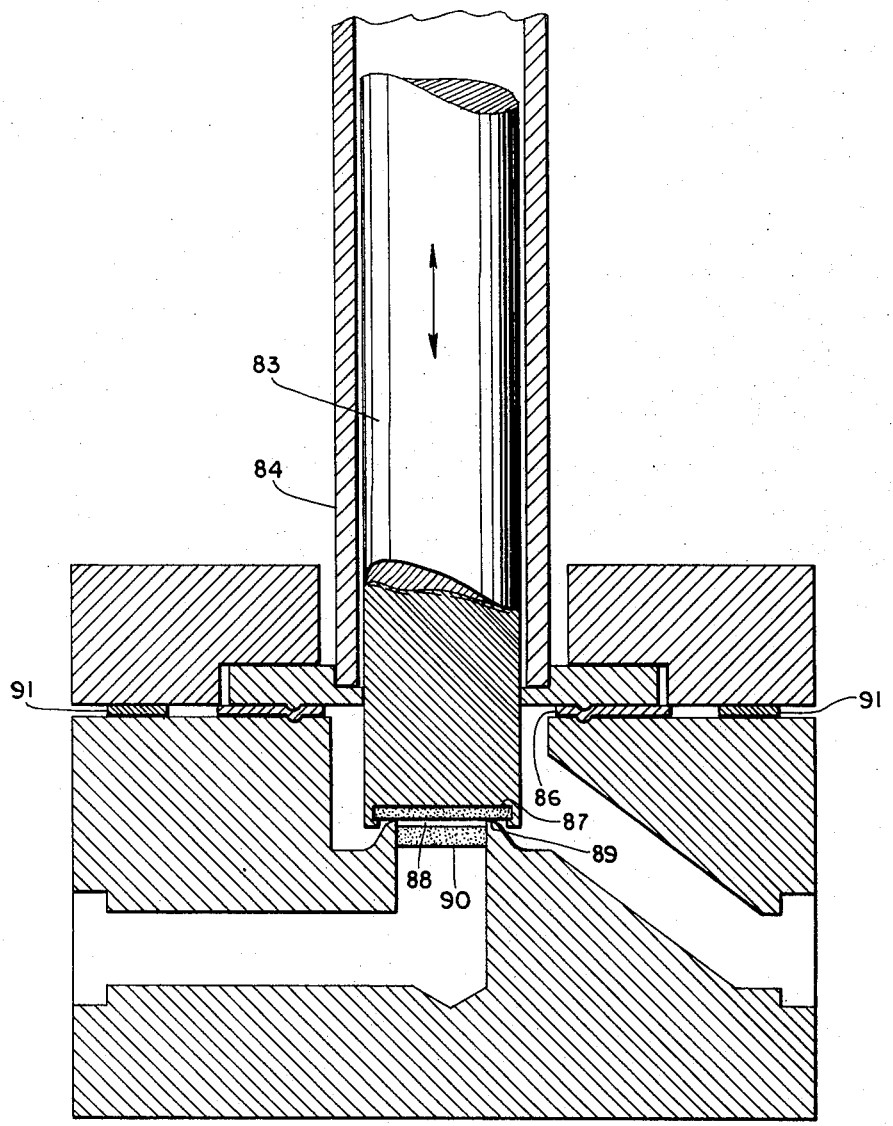

FIG. 6 is a section view taken along line of, showing a section view of one of the valve seats according to the disclosed embodiment of the present invention.

The following discussion on the theory of gaseous sorption analysis will be helpful to a more complete understanding of the disclosed embodiment of the present invention which follows.

The volume of gas absorbed per unit mass of solid $V_a/W$ depends on the equilibrium pressure P of the gas, the absolute temperature T, and the nature of the gas and solid. It is convenient to express the pressure in terms of $P/P_s$, the so-called relative pressure, where $P_s$ is the saturation vapor pressure of the adsorbing gas. When a series of adsorption measurements carried out at one temperature are plotted as $V_a/W$ versus $P/P_s$, the resulting graph is called an adsorption isotherm.

The great majority of solids yield isotherms which have significant regions of linearity, especially when adsorption is carried out at low temperature with inert gases. Analysis of these isotherms has been very successful in yielding the adsorbent surface area. For surface area evaluation, theory and mathematical expressions have been derived giving on justifiable grounds the condition at which monolayer converage occurs. Physical measurements of the volume of gas adsorbed as a function of pressure at a fixed temperature, therefore, permit calculation of $V_m$, the volume of gas required to form a layer one molecule thick. It can be shown that where $V_a$ is the volume of gas adsorbed at pressure P, $V_m$ is the volume adsorbed when the entire adsorbing surface is covered by a monomolecular layer, C is a constant, and $P_s$ is the saturation pressure of the gas.

$$P/V_a(P_s - P) = 1/V_m C + (C - 1/V_m C) P/P_s$$

Then a plot of applicable data for $P/V_a(P_s - P)$ versus $P/P_s$ gives a straight line, the intercept and slope of which are $1V_m C$ and $(C - 1)/V_m C$, respectively. The value of $V_m$ is thus readily extracted from a series of measurements. From this information and knowledge of the physical dimensions of single molecules, the surface area of the adsorbing solid is computed.

A surface area determination involves admitting an adsorbing gas — the adsorbate — to a sample of material of known weight — the adsorbent — which has been previously dried, weighed, and freed of adsorbed gases and vapors picked up from the atmosphere by application of heat and evacuation. The gas is admitted in incremental amounts. In an actual test, the gas is first let into a distributing manifold system of volume $V_d$ and temperature $T_d$ where its pressure $P_i$ is measured. The quantity of gas is established by the relationship $P_i V_d = n R T_d$, where R is the gas constant. A valve connecting the manifold system and the sample is then opened and the gas expands into the new space attaining the new pressure $P_2$. Some of it is adsorbed by the sample which is at a low temperature $T_s$, usually that of liquid nitrogen. The gas is now partly in the distributing manifold at the apparatus temperature, partly in the space about the sample at a low temperature, partly in interconnecting tubing at an intermediate temperature $T_i$, and partly adsorbed. A material balance written to encompass the shift from the first condition to the second is $$P_1 V_d/T_d = P_2 V_d/T_d + P_2 V_s/T_s + P_2 V_i/T_i + (760/273) V_a$$

where $V_s$, $V_i$, and $V_a$ are, respectively, the volume of the free space about the sample, the volume of the interconnecting tubing, and the volume of the gas removed by adsorption, with the volume of gas adsorbed expressed at standard conditions (760 mm Hg and 0°C).

When the process is repeated with a second quantity of gas, the pressure $P_2$ that was the final pressure before becomes the base, or equilibrium, pressure $P_e$ for the second step, and the material balance equation becomes $$P_1 V_d/T_d + P_e V_s/T_s + P_e V_i/T_i = P_2 V_d/T_d + P_2 V_s/T_s + P_2 V_i/T_i + 760 V_a/273$$

A correction must be made for the nonideal behavior of nitrogen and krypton at liquid nitrogen temperature. Sufficiently accurate allowance is obtained by multiplying the volume of gas in the sample space $V_s$ by the factor $1 + aP_e$, where a is the Perfect Gas Law correction factor and $P_e$ is the equilibrium pressure. A plot of $V_a/W_s$ versus $P_2/P_s$, where $P_s$ is the saturation pressure taken at the temperature of the sample during the test, yields an adsorption isotherm. These same $V_a$ and $P_2$ values substituted into equation, along with saturation pressure data, permit the plot to be made as described following equation from which the monolayer volume $V_m$ can be determined. This plot, giving what is called a BET equation isotherm, is almost always linear from 0.04 to 0.2 $P_2/P_s$; and the value of $V_m$, expressed in milliliters of gas per gram of sample, should be established using this linear section of the plot.

Once the plot is made, the specific surface area of the sample $S_w$ in square meters per gram is calculated using the appropriate area occupied by a single adsorbed gas molecule S — $16.2 A^{02}$ for nitrogen and $21.0 A^{02}$ for krypton — from the relationship $$S_w = S \times 10^{-20} \times 6.023 \times 10^{23}/22.414 \times 10^3 \text{ (slope + intercept)}$$

where the numerical factors are Avogadro's number and the molar gas volume. With nitrogen gas adsorbed at liquid nitrogen temperature, for example, equation 6 becomes $$S_w = 4.35/\text{slope} + \text{intercept}$$

and the specific surface area from the BET equation isotherm can be found.

Figure 1:
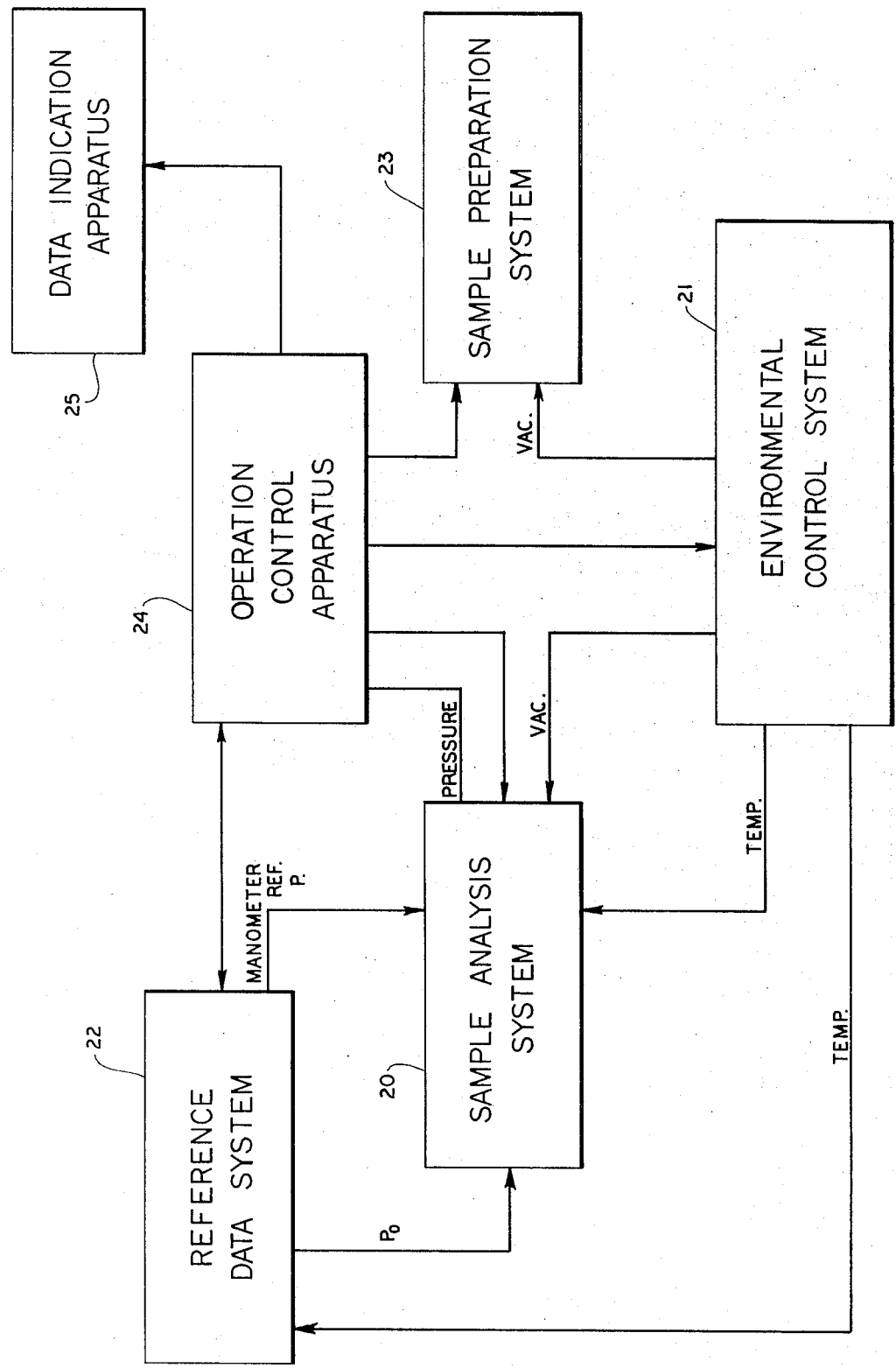
FIG. 1 is a block diagram setting forth in schematic form the several operational systems according to a preferred embodiment of the present invention.

Turning now to the Figures for a consideration of the disclosed embodiment of the present invention, such embodiment is seen in FIG. 1 to include a sample analysis system 29, an environmental control system 21, a reference data system 22, and a sample preparation system 23, all of which are operationally connected to an operational control apparatus 24 which is in turn connected to a data indication apparatus 25. As will become more apparent from the description which follows, the environmental control system 21 maintains a portion of the sample analysis system 20 at a fixed temperature and selectively maintains the samples undergoing analysis at a second fixed temperature, as preferably defined by selectively immersing the samples in liquid nitrogen, for example. The environmental control system 21 also supplies selected conditions of vacuum both to the sample analysis system 20 and the sample preparation system 23, as well as providing a temperature reference to the reference data system 22. The reference data system 22 determines the saturation pressure of the gas being used in the sample analysis system 20 and thus provides a point of reference against which selected partial saturation pressures are subsequently determined.

The sample analysis system 20, the environmental control system 21, the reference data system 22, and the sample preparation system 23, as becomes apparent below, contains numerous valves and other controls which are schematically shown in FIG. 1 to be operationally associated with an operation control apparatus 24. Exemplary sequences of valve and other control operation are detailed herein, and it will become apparent to those skilled in the art that these as well as other desired sequences of operational control can be performed either manually or can be programmed for automatic operation either by analog devices and techniques or, more preferably, by a general-purpose digital computer appropriately programmed to carry forth the desired sequence of operation.

Sample Analysis System

Considering next FIG. 2, there is shown in schematic form the disclosed embodiment of gas flow control apparatus which makes up the sample analysis system, as well as the sample preparation system and portions of other systems as described below. The sample analysis system includes a plurality of valves 30a, 30b, 30c, 30d, and 30e, each of which is separately connectable on a first side thereof to separate sample holders made of glass or another appropriate material, containing corresponding separate samples of material undergoing gaseous sorption analysis. The other sides of the valves 30a–30e are connected in common as at 31 to communicate with a conduit 32 which is in communication with a valve V6, another valve V7, and a pressure sensing apparatus 33. The pressure sensing apparatus 33, which is of the manometer type having a reference pressure of approximately zero psia provided by the sorption pump 34 as immersed in liquid nitrogen, may in practice be of the type utilizing one or more differential bellows or diaphragms connected with suitable motion transducing devices to produce an electrical signal corresponding to pressure-induced movement or deflection of the bellows, diaphragm, or the like.

The conduit 32 is selectively connectable through the valve V6 with a closed volume 35 for a purpose set forth below.

The valve V7 communicates with a manifold 38 which in turn is selectively connectable through the restricted-flow valves V12, v13, and V14 to suitable sources of gaseous nitrogen, krypton, and helium. The manifold 38 also is selectively interconnectable through the valve v11 and a volume 39 to a $P_o$ manometer 40. The manifold 38 is also selectively connected through the valve v10 to the evacuation controls contained in the environmental control system 21.

Environmental Control System

The environmental control system 21 includes a vacuum or evacuation system including a rough pump 43 selectively connectable through the valve V16a to the diffusion pump 44. The diffusion pump 44 is connected through a cold trap 45 and the valve V16b to a common conduit 49. The valves V16a and V16b are so designated because such valves are always operated in parallel, with both such valves being either currently open or concurrently closed.

The common conduit 49 is directly connected to the rough pump 43 either through the valve V15 or through the restricted-flow valve V17, thereby affording either a complete bypass or a restricted-flow bypass of the diffusion pump 44 and the cold trap 45 depending upon the operative condition of the valve V15 or V17. The common conduit 49 is selectively connectable to the sorption pump 34 through the valve V9, to the manifold 38 through the valve V10 as aforementioned, and through the valve V8 to the sample preparation system 23.

The sorption pump 34, which provides the near-absolute zero reference pressure for the pressure sensing apparatus 33, may be provided by a container filled with a very efficient adsorbent, such as granulated activated charcoal, positioned to be submerged during measurement periods in liquid nitrogen and exposed to the vacuum system. The sorption pump is initially evacuated by the vacuum system through opened valve V9 to reduce the reference pressure substantially to zero, and the adsorbent material in the sorption pump further reduces and maintains the pressure at near-zero at subsequent times when the sorption pump is isolated from the vacuum system by closure of the valve V9.

The sorption pump maintains this near-zero reference point for extremely long periods of time through the adsorbing capacity of the adsorbent, even though a leak should develop or an interruption occurs in the operation of the apparatus. The adsorbent material in the sorption pump is regenerated by re-exposure to the vacuum system during the normal operation of the apparatus.

The $P_o$ manometer 40, as is known to those skilled in the art, contains a quantity of suitable material having a large surface area on which a considerable amount of nitrogen gas, in the present example, is adsorbed at the adsorption temperature provided by liquid nitrogen as is set forth below. The $P_o$ manometer thus provides a saturation pressure for liquid nitrogen at the temperature of the samples being evaluated. Since the manometer 40 is disclosed as being immersed in liquid nitrogen to define the reference temperature at which the saturation pressure is determined, it will be understood that this saturation pressure for nitrogen can be used as a constant to determine the saturation pressure for another gas, such as krypton, in the event that such other gas is used in place of nitrogen for the gas sorption analysis.

Figure 2:
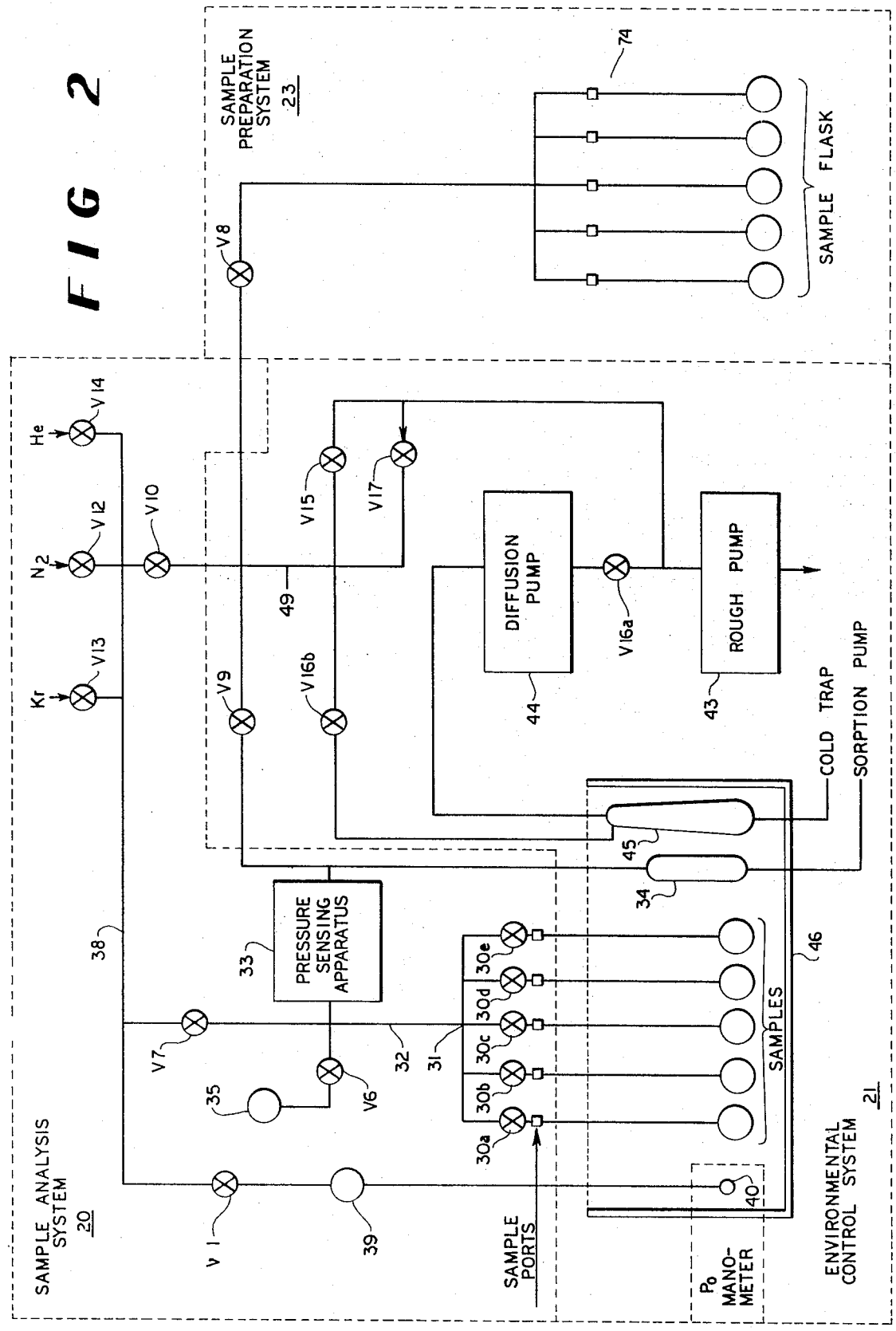
FIG. 2 is a schematic diagram showing a complete gas flow and control system according to the disclosed embodiment of the invention.

The environmental control system includes a Dewar flask 46 which is selectively raised to a position shown in FIG. 2, wherein the manometer 40, the sample containers, the sorption pump 34, and the cold trap 45 are disposed within the Dewar flask and may be submerged in a substance such as liquid nitrogen to define a substantially predetermined temperature. As seen in FIG. 3, the Dewar flask 46 is mounted for a limited extend of vertical movement controlled by the movement mechanism 47 and a motor 48. Suspended over the Dewar flask 46 by means of a plurality of flexible members 51 is the Dewar lid 52, through which are appropriately mounted the sample containers as well as the sorption pump 34 and the cold trap 45. A probe containing a thermistor 53 is also mounted to extend beneath the lid 52 a spaced distance corresponding to the nominal level of liquid nitrogen desired to be contained within the Dewar flask 46. This thermistor 53 is connected through appropriate control circuitry to control the valve 54 which is interconnected between a source nitrogen gas, the conduit 55, and a storage Dewar flask 56 containing an operating supply of liquid nitrogen.

A line 57 extends from a point adjacent the bottom of the storage Dewar 56 to a supply tube 58 extending through the lid 52. The line 55, which is connected to the opened or free space above the liquid nitrogen in the storage Dewar 56, is provided with a vent valve 59 connected to operate in response to closure of a switch 60 disposed in the differential pressure gage 61.

When it is desired to operate the Dewar flask 46 for nitrogen emersion, this flask is first raised by the movement mechanism 47 to a fully-raised position, whereat the upper rim of the Dewar engages the lid 52 and preferably raises such lid to an extent removing tension from the flexible members 51. The valve 54 next is opened to pressurize the free space in the storage Dewar 56, whereupon liquid nitrogen is forced from the storage Dewar through the line 57 and the supply tube 58 to enter the Dewar flask 46. This filling operation continues until the level of liquid nitrogen in the Dewar flask 46 contacts the thermistor 53 causing cooling action of the thermistor which is appropriately translated into a signal controlling closure of the nitrogen gas valve 54. The pressure equilization valve 62, which was maintained open during the nitrogen filling operation to equilize the differential pressure across the pressure gage 61, is also closed at this time. The switch contact 60 of the differential pressure gage 61 is normally biased to a closed condition in the presence of zero differential pressure, and so this switch now operates to open the vent valve 59 to bleed gaseous nitrogen from the conduit 55 to an extent wherein the liquid nitrogen in the line 57 is permitted to withdraw to a predetermined level as shown, for example, by the line 65. The level of line 65 is determined by the differential pressure, sensed by the gage 61, whereat the switch contact 60 is opened to permit closure of the vent valve 59. This arrangement permits the supply of liquid nitrogen to be maintained at a predetermined ready level in the conduit 57 irrespective of pressure increase in the free space of the storage Dewar arising from boil-off of the liquid nitrogen.

It will be apparent that lowering of the liquid nitrogen in the Dewar flask 46 is sensed by the thermistor 53, whereupon the foregoing fill cycle is initiated to the extent necessary to raise the liquid nitrogen level in the Dewar flask 46 back to a level which covers the thermistor 53.

The storage Dewar 56 may be provided with a liquid level gage including four thermistors 66, 67, 68, and 69 positioned at predetermined liquid levels such as 25, 50, 75, and 100 percent of a filled condition. The thermistors 66-69 are connected through suitable circuitry to an indicator 70, which may be calibrated in corresponding percentages. It will be understood by those skilled in the art that the interconnecting circuitry preferably includes current control devices adjusting the flow of current through the meter 70 to provide the discrete meter indications. Alternatively, of course, each of the four thermistors 66–69 could be connected to lamps or other signal devices to provide the appropriate indication.

Sample Preparation System

The sample preparation system 23, as more particularly shown in FIG. 2, includes a plurality of interconnection locations jointly denoted at 74, to which can be connected a corresponding number of sample flasks, and which are connected in common to one side of the valve V8. The valve V8, when open, interconnects all of the sample flasks connected at 74 with the common conduit 45 and any combination of vacuum pumps connected therewith. It will be seen that a first group of sample flasks may be undergoing sample preparation as at 23 while a second group of sample flasks may be undergoing sample analysis at 20.

Valve Design and Thermal Stabilization

The valves and valve assemblies utilized in the disclosed embodiment of the present invention are constructed to minimize or eliminate outgassing, thermal instability resulting from continuously-operating solenoid coils, introduction of volumetric errors caused by valve member movement, and inter-valve leakage. Moreover, since it is essential to the proper operation of the present method and apparatus that a constant temperature be maintained throughout conduits and other areas of the apparatus which define a predetermined volume, the valves V7, V8, V9, V10, V11, V12, V13, and V14 are provided by valve seats machined from a solid block 80 of non-outgassing material such as Monel metal. The valve ports and valve interconnecting conduits are provided by channels bored within the block 80 to interconnect the valves in an appropriate manner as schematically shown in FIG. 2. It will be appreciated that an arrangement of this sort reduces the number of welded or other plumbing or other connections made with the valve block 80, thereby reducing the potential leakage paths.

The five sample valves 30a–30e and the valve V6 are also provided by valve seats and interconnecting conduits machined from a second single block 81 of a material such as Monel metal. The symmetrical configuration shown in FIGS. 5A and 5B insures uniform volumetric distribution of gas. The pressure sensor 33 is in communication with the central opening as indicated.

The section view of FIG. 6 shows interior details of one of the aforementioned valves, including a valve plunger 83 mounted for reciprocal movement within the valve stem 84. The valve stem is retained against the valve block by means of an annular clamp member 85 attached by screws 91 or the like to the block so as to secure a gasket 86 of a suitable material such as Kel-f or the like engaged in an annular depression formed surrounding the valve opening. The valve plunger includes a seat recess 87 having a seat 88 of a suitable material such as Viton. It can be seen from FIG. 6 that the valve stem 83, places the seat 88 against a corresponding annular stationary seat 89.

It can be seen that the valve plunger 83, when in the lowered or closed position, engages the valve seat 88 against the annular stationery valve seat 89, thereby accomplishing valve closure. Moreover, it will be understood that raising the plunger causes opening of the valve. In the case of the valves V12, V13, V14, and V17, which are restricted-flow valves, a suitable flow restriction element 90, which may be provided by a disc made of a suitable sintered metal, may be inserted within the stationery valve seat 89 to provide the desired flow restriction effect without unwanted pressure accumulation between the valve and the restriction.

The two valve blocks 80 and 81 are preferably attached by bolting or other appropriate techniques to a single unitary, thermally-massive block of a metal such as aluminum or the like which has relatively high heat transfer capability. The aluminum base block is provided with one or more heating elements preferably disposed within corresponding bores or apertures within the base block, as well as one or more thermistors or other suitable temperature-responsive elements, secured within the base block and operatively connected through appropriate controlled circuitry to control the power to the aforementioned heaters. Such an arrangement of valve blocks and base block, when the base block is appropriately insulated, has been found to be effective to maintain the associated valves and interconnecting conduits to within about 0.02°C of nominal temperature.

Since the use of valve actuating solenoids of a type which require constant energization to maintain the valve open (or closed) produce an unwanted amount of heat which would jeopardize the desired thermal stabilization, it is preferable to use valve actuators which shift and retain the valve plungers to either the open or closed position after a momentary pulse of current. Such valve actuators are known to those skilled in the art and need not be described herein.

OPERATION

The operation of the apparatus as herein described is set forth below in detail. Although the following description of operational steps and techniques is stated under a number of headings to facilitate description, it should be understood that this is done for illustrative purposes only and without intent to limit the present invention.

Initializing the System

At the commencement of a gas sorption analysis performed according to the present invention, one or more sample flasks are connected through appropriate fittings to corresponding ones of the sample valves 30a–30e. These sample flasks, each of which contains a material sample of known weight, preferably have been previously prepared by a sample preparation system such as shown at 23 to remove unwanted moisture and gases which would introduce error in the following analytical procedure. The nature and operation of such sample preparation procedure is discussed below. It is necessary in the operational steps which follow that each of the sample flasks be evacuated to a pressure which is essentially a hard vacuum. Since the material samples in the flask typically consist of material in powder or granular form, it will be seen that subjecting the sample flasks directly to one of the vacuum pumps will lower the pressure in the flask so rapidly that the granular material will be sucked from the flask into the conduits and valves of the system, and the sample material may actually be drawn into one or more of the vacuum pumps. If the evacuation of the sample flasks is applied through orifices or other flow restrictors to the extent necessary to prevent withdrawing of the sample material, the resultant slow evacuation of the flasks may require times measured in hours to achieve the desired hard vacuum. The following technique of the present invention is used to provide evacuation of the sample flasks to a hard-vacuum state in a relatively few minutes without sample withdrawal and without requiring variable-area orifice valves or other specialized and expensive equipment.

The sample initialization procedure commences by pressurizing the sample flasks and other portions of the vacuum system to a level equal to or slightly above atmospheric pressure. This is accomplished in the disclosed embodiment by flooding the samples and portions of the system with helium by opening the valves V14, V10, V7, and V6, while maintaining closed the valves V11, V8, V9, V16a and V16b, V15, V17. Helium gas enters the manifold 38 through the open valve V14 and thence flows through the also-opened sample valves 30a–30e (assuming a sample flask is connected to each sample valve), so that these sample flasks, as well as the conduit 32, the extra volume 35, the manifold 38, and the common conduit 49 are all charged with helium at a pressure of 760mm of mercury, for example, as determined by the pressure sensing apparatus 33.

As soon as the helium precharging is accomplished to the desired pressure, the helium supply valve V14 is closed and the restricted-flow valve V17 is opened to place only the rough pump 43 in evacuating communication with a volume including the common conduit 49, the manifold 38, the conduit 32, the extra volume 35, and the combined volumes of all sample flasks. Since the rough pump 43 is connected through the restricted flow valve V17 at this time, and since the rough pump initially commences evacuating the prefilled helium at or slightly above atmospheric pressure, it will be appreciated that evacuation of the sample flask commences at a relatively gradual rate which will cause no significant disturbing of the sample materials disposed therein.

The rough pump 43 remains connected to the system through only the restricted-flow valve V17 until the pressure sensing apparatus 33 determines that a predetermined pressure, such as 150mm, for example, has been reached, at which point the valve V6 is operated to close off the extra volume 35 from the conduit 32 and the remainder of the system being evacuated. This reduction in total volume in the system being evacuated enables the pumping action of the rough pump through the restricted-flow valve V17 to now be applied against a reduced overall volume, thereby increasing the rate at which the new overall volume, including the sample flasks, is evacuated.

Evacuation in this manner continues until a second predetermined pressure, such as 20mm, is sensed by the pressure sensing apparatus 33, at which point the system may be manipulated to sequentially define a closed volume which excludes the sample flasks and which is relatively rapidly evacuated further, and which is then connected to the greater volume including the sample flasks. For example, when the previously-mentioned pressure of 20mm is reached, valve V10 can be closed and valve V15 simultaneously opened (along with the restricted-flow valve V17 remaining open) to apply the rough pump 43 directly to the common conduit 49. The pressure within the common conduit 49 is relatively rapidly reduced downwardly from 20mm by the rough pump 43. After a predetermined time, such as several minutes, has passed, the valve V15 is again closed and the valve V10 is opened so that the reduced pressure in the common conduit 49 is equalized with the relatively higher pressure in the remainder of the system being evacuated. This permits a fixed volume at the relatively reduced pressure to be incrementally added to the greater overall volume being evacuated, resulting in a stepwise further evacuation of the sample flasks to a limited extent which causes little or no disturbance of the sample materials therein.

This incremental or stepwise evacuation by the aforementioned manipulation of valves V10 and V15 can be repeated a number of times as necessary to reduce the pressure measured by the pressure sensing apparatus 33 to yet another lower level such as, for example, 5mm, at which point valves V10 and V15 can be safely opened to connect the rough pump 43 in direct communication with the sample flasks without danger of withdrawing the sample materials. The pressure in the system including the sample flasks is further lowered until a predetermined pressure of 100 microns, for example, is reached, at which point the valves V15 and V17 are closed and the valves V16a and V16b are opened to apply the full pumping system including the rough pump 43, the diffusion pump 44, and the cold trap 45 in direct communication with the sample flasks. This pumping continues until a final desired measured pressure of 10 microns, for example, is sensed, whereupon the pumping may be continued for an arbitrary predetermined time of fifteen minutes, for example, to insure that pressure build-up through outgassing of the material samples and the materials of the vacuum system is substantially finished.

It may be desirable at this time to perform certain testing operations to evaluate the obtained vacuum and to detect the possible existence of leaks in the system. This may be accomplished by closing the valve V10 thereby disconnecting the pumping chain from the evacuated system, while the valves V6, V7, and 30a–30e remain open. If the rate of pressure increase in this closed system, as measured by the pressure sensing apparatus 33, exceeds a certain predetermined amount such as, for example, two microns per minute, then the valve V10 can be reopened to evacuate the system for another predetermined period of time. If the pressure increase was caused by continued outgassing, it will be obvious that continued evacuation of the system will eventually minimize or eliminate the pressure rise caused by outgassing. On the other hand, it will be understood that a rate of pressure increase resulting from a leak in the system will remain substantially constant irrespective of repeated periods of further evacuation.

Assuming that the chosen two micron per minute rate of pressure increase is satisfied when the valve V10 is closed, the valve V7 is next closed and the pressure sensing apparatus 33 is again observed to determine the rate of pressure increase in the volume including the conduit 32 and all of the sample flasks. Assuming that the maximum permissible rate of pressure increase is met at this time, or by one or more repeated sequences of further evacuation, the system is ready for subsequent phases of operation. On the other hand, if the presence of a leak is indicated, a further level of leak detection evaluation can be accomplished by closing all but one of the sample valves 30a–30e, in a sequence to determine which one or ones of the sample flasks or interconnecting hardware is the source of a constant rate of pressure increase. The offending sample flask or flasks can be disregarded in subsequent operation of the system.

The next step in the initialization procedure is the precharging of the $P_o$ manometer. With all of the sample valves 30a–30e closed, and with the valve V10 also closed to isolate the vacuum pumping system, the valves V12, V17, and V11 are opened to allow nitrogen gas to enter the $P_o$ manometer 40 until a predetermined high pressure such as 850mm, is present in the $P_o$ manometer as determined by the pressure sensing apparatus 33. When this desired pressure is reached, the nitrogen supply valve V12 is closed and the Dewar flask 46 is raised and filled with liquid nitrogen as previously described to surround the $P_o$ manometer as well as the sample flasks, the sorption pump and the cold trap. This lowering of temperature of the $P_o$ manometer causes a small amount of the gaseous nitrogen in the manometer to condense, thereby establishing the saturation pressure of nitrogen at a temperature which is also the temperature at which subsequent analysis of the sample flasks occurs.

The valve V11 is then closed and the valves V10 and V15 are opened so that the nitrogen gas remaining in the manifold and connected conduits is quickly evacuated from the system. The sample valves 30a–30e remain closed at this time. The nitrogen saturation pressure remains in the $P_o$ manometer, behind now-closed valve V11 for future reference use.

The final step in the initialization procedure consists of determining the free space in each of the sample flasks, with "free space" as used herein meaning the volume of the flask which is not occupied by the sample material undergoing analysis. The determination of free space is made for each of the sample flasks in sequence by allowing a certain volume of helium gas to expand into each of the evacuated flasks in sequence, helium being chosen because it is substantially inert and also because there is no appreciable adsorption of helium into the sample materials at the temperature of liquid nitrogen. With all of the sample valves 30a–30e closed and with valves V10 and V11 remaining closed, valves V6, V7, and V14 are opened to charge the system including the conduit 32 to a predetermined pressure of helium gas pressure of 760mm, for example. When this pressure is reached as determined by the pressure sensing apparatus 33, the valves V14 and V7 are closed to define a measuring volume of gas entrapped in the common area between the closed valves V6, V7, and 30a–30e and including the connection 31 and the conduit 32.

The sample valve 30a, by way of example, is next opened to permit the volume of helium previously entrained in the measuring volume to expand into the evacuated free space of the sample flask associated with that sample valve. After a condition of pressure equilibrium has occurred, the reduced pressure resulting from the expansion of a certain volume of gas into the combination of the measuring volume and the aforementioned free space is measured, and it will be understood that the ratio of pressures before and after such expansion is determined by the free space into which the gas expanded. It will also be understood that the temperature stabilization of the valves and conduits obtained through the previously-described valve block and mounting plate arrangements, or by other appropriate techniques, is essential if the foregoing pressure-volume relationship is to be valid.

The condition of pressure equilibrium can be obtained in a number of ways. For example, the sample valve 30a can be maintained opened for an arbitrary predetermined amount of time, such as 1.5 minutes, to insure that the helium pressure is equilibrated. Alternatively, a number of pressure measurements from the sensing apparatus 33 can be taken over relatively short intervals of time, such as every two seconds, and the pressure measurements thus made can be mathematically used to determine a condition when the rate of pressure change has reached a desired minimum level. More specifically, the aforementioned two-second periodic pressure measurements can be observed until a number of successive such measurements, such as seven in number, are representative of a line having zero-slope, at which time the pressure which gave rise to the zero-slope condition can be assumed to be equilibrated. It will be appreciated that a pressure equilibrium determination involving the aforementioned use of a multi-point line reaching zero-slope conditions becomes practically feasible only through the use of computational apparatus as afforded, for example, by a suitably programmed digital computer or by other computational apparatus. The saving in time afforded by such computational techniques is appreciable, however, when it is considered that a great number of such equilibrium states must be determined during the course of gaseous sorption analysis.

The reduced pressure resulting from the free space determination can advantageously be converted by standard computation techniques to a value which represents a corresponding number of "standard ccs" of helium gas, taken at appropriate standard reference temperature and pressure. The use of standard volumes of gas provides a common point of reference against which all volume measurements of the apparatus and method may be made.

The foregoing free space determination is repeated for each of the four remaining sample flasks in turn, with each flask continuing to contain a volume of helium gas following its turn in the free space determination. When the free space of the last sample flask has been determined, the initialization procedure is completed and the steps of sample analysis may commence.

Surface Area Analysis

As previously discussed, surface area analysis according to the present invention is conducted through determining a number of points which enable a least squares fit of the BET equation to be accomplished. These points in the disclosed embodiment are calculated at 0.04, 0.08, 0.12, 0.16, and 0.20 partial pressure, relative to the saturation pressure as measured by the $P_o$ manometer and designated 1.00 relative to the aforementioned partial pressures. Considering the first one of the samples to be analyzed, it is assumed that the sample of material contained therein is capable of adsorbing a volume of nitrogen gas (for example) at least equal to a certain first percentage of the previously-determined free space within that flask. The sample flask after being evacuated following the free-space determination, is accordingly supplied with a volume of nitrogen gas equal to the previously-determined free space of that flask plus a certain percentage of such free space. Assuming that the incremental percentage dose is selected to be ten percent, the nitrogen supply valve V12 and the valves V7 and V6 are open, with all of the sample valves 30a–30e remaining closed. The measuring volume is allowed to become pressurized with nitrogen gas to a pressure which, when subsequently allowed to expand into the particular sample flask, will add to that flask a volume of gas corresponding to the sum of (1) the free space volume and (2) a certain percentage of the free space volume. During this charging procedure the valve V6 can be opened to allow the extra volume 35 to become charged to the same pressure. As soon as the predetermined pressure is reached in the measuring volume, the valves V12, V7, and V6 are closed and the sample valve 30a, for example, is opened to discharge the gas into the sample flask.

Assuming that the first point on the BET curve, corresponding to 0.04 of the saturation pressure, is being sought at this time, the desired pressure to be measured by the pressure sensing apparatus 33 may be, for example, 38mm. As soon as the first dose of gas enters the sample flask through the open sample valve, the equilibration pressure in the volume including the measuring volume and the free space of the sample flask is measured by the pressure sensing apparatus 33. This equilibration pressure may advantageously be measured through a multipoint technique as described previously, wherein pressure readings at periodic intervals such as two seconds are taken from the apparatus 33 and are observed until a successive number of pressure indications, such as seven successive pressure determinations, are taken which define a line having a slope of zero. At this time, the pressure within the sample flask can be considered equilibrated and the thus-equilibrated pressure is then examined to determine if this pressure falls below the desired pressure corresponding to the particular partial pressure ratio being sought. If this is the case, another dose of gas must be applied to the sample in a repetition of the foregoing dosage routine.

When the equilibrium pressure of the gas in the sample flask is being measured, it may be apparent upon taking the first pressure measurement that the pressure in the sample flask will equilibrate at a point which cannot possibly reach the predetermined target pressure corresponding to the preselected partial pressure point. If this is the case, the sequence of operation may proceed immediately to applying an additional dose of gas to the sample flask, since the time spent in achieving an equilibrium pressure would be wasted in any event.

The amount of the second (or a subsequent) dose of gas is computed in a manner similar to the computation of the initial dose. Assuming that the equilibration pressure following the initial dose of gas was 20mm, for example, and the first desired partial pressure point corresponds to a pressure of 38mm, it can be readily computed from known pressure-volume laws that a total quantity of gas must be added to the sample flask in an amount (1) to fill the free space to the extent necessary to reach 38mm of pressure, plus (2) an estimated percentage of amount (1) which will by adsorbed by the sample material. This estimated percentage for the second dose may be selected to be larger or smaller than the incremental percentage of the first dose, depending on the amount by which the equilibrium pressure produced by the first dose deviates from the desired target partial pressure. An equilibrium pressure is determined for the second dose in the previously-described manner, and it can be seen that one or more subsequent doses of gas may additionally be necessary to bring the measured equilibrated pressure up to a level corresponding to the target pressure for the first BET point.

The total volume of gas added to the sample flask to reach this first partial pressure point is obviously the sum of the individual dosage volumes, as computed by the pressures of these doses as initially contained in the measuring volume and as subsequently measured upon expansion into the sample flask. The amount by which these summed volumes exceed the previously-determined free space of the flask corresponds to the volume of gas adsorbed by the sample material at a particular partial pressure point. A partial pressure point may be considered as being "reached" for practical purposes when the equilibrium pressure in the flask falls within a desired pressure range surrounding the target partial pressure point. The foregoing sequence of dosing steps is repeated for each of the remaining partial pressure points which have been selected to define a least squares fit of the BET equation. It will be apparent that the gas dosage technique as described herein, utilizing a measuring volume and relying on the measured decrease in pressure of a dose of gas at a certain pressure previously admitted to the measuring volume, is workable only if the temperature of the measuring volume is closely controlled, and also only if the level of liquid nitrogen in the Dowar flask 46 is closely controlled. Control of the liquid nitrogen level is accomplished with the apparatus as previously described with respect to FIG. 3.

When the respective volumes of gas necessary to attain each of the preselected partial pressure points has been measured, the BET equation can be determined by a least squares technique known to those skilled in the art. If the operation control apparatus 24 is provided by a computational device such as a programmable general purpose digital computer, it will be apparent that the least-squares computation of the BET line can readily be accomplished by appropriate programming of the computer. Alternatively, of course, the least-squares line can be calculated manually or by other mechanized techniques.

Pore Volume Analysis

An adsorption isotherm is accomplished according to the present invention by extending the previously-described dosing sequence along a selected number of predetermined partial pressure points which culminate at a desired value, such as 0.99 $P_O$, closely approximating the saturation pressure of nitrogen (or another gas being used). If an absorption isotherm is to be run on a particular sample immediately following completion of a surface area analysis, it can be seen that five data points have already been obtained toward the 0.99 $P_O$ level. Accordingly, an additional number of partial pressure points can be selected and one or more doses of gas dispensed first to the measuring volume and thence to the sample flask in the manner as described above, so that the standard volume of gas required to achieve each of the partial pressure points is determined. As a specific example, 39 additional partial pressure points have been used in going from the 0.20 $P_O$ partial pressure used in determining the BET equation up to 0.99 $P_O$.

A desorption isotherm is obtained in a technique exactly the converse of that described for an absorption isotherm, with the measuring volume being pumped down to a predetermined "dose" pressure (actually a negative pressure dosage) followed by opening of the particular sample valve to permit the gas in the sample flask to expand into the measuring volume with a resulting increase in pressure measured therein. In the case of a total number of 44 partial pressure points required to obtain near-saturation for an absorption isotherm, the same number of partial pressure points can be used in returning from near-saturation down to a partial pressure of near-zero in the sample material. A desorption isotherm may also be obtained immediately after completion of surface area analysis simply by dumping into the sample flask a large volume of gas to reach a near-saturation level, after which the desired number of doses of gas are withdrawn from the saturated sample material and a summation made of the quantities of withdrawn gas doses which represent gas desorped from the sample material.

In all of the gas dosing steps described above, the extra volume 35 can be used as desired to accomplish a more rapid addition or subtraction of gas to the measuring volume. Since the valve V6 is closed at a time when the measured volume is in communication with a particular sample flask, the calculation of gas absorbed (or desorbed) can be determined from the pressure-volume relation as described above, without being biased by the extra volume 35. None of the gas doses applied to or removed from the sample flask is a constant or predetermined volume of gas, since the actual volume of each dose of gas is determined from the pressure rise (or drop) after the dose is accomplished. In this way, the necessity of providing closely-reproduceable gas dosage volumes is completely obviated according to the present invention. In the case of each partial pressure-related measurement, the volume of gas added or subtracted and corresponding to the summation of the dosage volumes for that partial pressure, is the data output from which other factors such as the BET equation and the isotherms can be determined.

Sample Preparation System

Sample materials contained in suitable flasks are prepared in the sample preparation system 23 through an outgassing routine substantially similar to the outgassing of the samples as described in the initialization procedure with the sample analysis system. The sample degassing routine commences with opening of the valves V6, V7, V10, and V14, so that the volumes defined between those valves is filled with helium gas to a pressure exceeding 760 millimeters. The valve V14 is closed at that time, and the valve V8 is opened to interconnect the sample flasks associated with the connection location 74. The restricted-flow valve 17 is opened to slowly pull the pressure down, and heat is applied to the sample flasks by surrounding heating mantels or other suitable techniques. The degassing sequence which can be accomplished concurrently with ongoing operation of the sample analysis section, progresses as described above until a desired low pressure is obtained and maintained for a predetermined period of time, indicating substantially complete outgassing and substantially no leakage, whereupon the system is again flooded with helium to charge the sample flasks with an inert gas. The flasks can then be stoppered and removed for subsequent connection to the sample analysis system.

Power Failure Protection

If the operation control apparatus 24 is provided by a programable general-purpose computer, operational steps can be easily provided to permit the apparatus and method of the present invention to be placed in a state of suspension for a considerable period of time in the event of a loss of operating electrical power. This is accomplished by providing a power failure sensor, which may be any known device or circuit which can operate to detect loss of power within one-half cycle, connected to initiate a program routine which immediately transfers the contents of the major computer registers to selected locations in a memory which is not damaged by the loss of power. Also, the identities of the valves which are open at the time of power failure is also placed in memory, after which these opened valves are immediately closed. The power necessary to provide the aforementioned data transfer and valve closure can be provided either through the use of energy stored in power supply filter capacitors and valve energy storage capacitors, or through the use of longer-term auxiliary power such as batteries or the like.

When power is again returned to the system, the computer can be programmed to return the stored data to the appropriate registers and to re-open the valves which were previously memorized as having been opened at the time of power failure. The computer can then continue the operating routine at the point where power failed. Depending upon the capacity of the dewar flask and other factors, power failures of up to two hours can be tolerated without adverse effect on the analysis being run.

Although the foregoing relates only to a preferred embodiment of the present invention, it will be apparent that numerous alterations and modifications may be made therein without departing from the spirit and the scope of the present invention as set forth in the claims herein appended.

We claim:

1. In an apparatus for selectively indicating the surface area and the pore volume distribution of a sample of porous material in a sample flask in response to the quantity of gas adsorbed or desorbed by the sample when the sample and the gas are at a predetermined temperature in the sample flask and the gas is at a predetermined pressure in the sample flask; temperature control means for maintaining a sample flask and a sample and a gas within said sample flask at a predetermined temperature; means for substantially evacuating the atmosphere within said sample flask; operation control means for changing the quantity of said gas within said sample flask by successive increments of gas, the amount of each of said increments of gas being responsive to the adsorbed or desorbed quantity of said gas within said sample flask resulting from a previous one of said increments of gas and the total quantity of gas changed by all of said increments of gas being sufficiently large to cause said gas within said sample flask to be at a predetermined pressure; and indicating means responsive to said total quantity of gas changed by all of said increments of gas for selectively indicating the surface area and the pore volume distribution of said sample.

2. The apparatus of claim 1 in which said operation control means is operative to change the quantity of said gas by selectively adding said increments to said sample flask or removing said increments from said sample flask.

3. The apparatus of claim 1 in which said operation control means is operative to select a plurality of said predetermined pressures in certain predetermined sequence.

4. The apparatus of claim 1 in which said sample flask is one of a plurality of sample flasks positioned in a mounting means for mounting said plurality of sample flasks, in which said temperature control means is simultaneously operative with respect to all of said sample flasks, and in which said operation control means and said indicating means are selectively operative with respect to each of said plurality of sample flasks.

5. The apparatus of claim 4 including means for indicating the one of said plurality of sample flasks with respect to which said operation control means and said indicating means are operative.

6. The apparatus of claim 4 including means responsive to a leak in said mounting relative to one of said plurality of sample flasks for causing said operation control means to be inoperative as to said one of said plurality of same flasks.

7. The apparatus of claim 1 in which said operation control means includes a first means for changing the quantity of a first gas within a first sample flask in successive increments of gas and a second means including said evacuating means for simultaneously removing substantially all of a second gas from a second sample flask.

8. The apparatus of claim 7 in which said second means removes said second gas from said second sample flask at successively different rates and including heating means for heating said second sample flask and a sample within said second sample flask.

9. The apparatus of claim 8 including means responsive to said rates for rendering said second means inoperative when any of said rates is in excess of a predetermined rate.

10. The apparatus of claim 7 in which said second means includes a mechanical vacuum pump, an oil diffusion pump and a cold trap selectively operative to remove said second gas from said second sample flask.

11. The apparatus of claim 7 in which said second sample flask is one of a plurality of second sample flasks and in which said second means simultaneously removes a gas from all of said plurality of second sample flasks.

12. The apparatus of claim 7 in which said operation control means includes a gas supply means for supplying a replacement gas to said second sample flask.

13. The apparatus of claim 1 in which said gas is selectively one of an available plurality of gases.

14. The apparatus of claim 1 in which said temperature control means includes a vessel for receiving liquid nitrogen, level sensing means for sensing the level of liquid nitrogen in said vessel, and transfer means responsive to said sensed level of liquid nitrogen in said vessel for transferring liquid nitrogen from a storage means for liquid nitrogen when said level of liquid nitrogen is below a predetermined level, and in which said operation control means raises said vessel from a first position to a second position in which said sample flask is partially immersed in said liquid nitrogen.

15. The apparatus of claim 14 including gas absorbing means immersed in said liquid nitrogen for determining a reference saturation pressure of liquid nitrogen.

16. The apparatus of claim 14 in which said operation control means is responsive to said pressure of said gas within said sample flask relative to a reference pressure to provide a successive increment of said gas at a pressure proportional to said sample flask gas pressure, and including reference pressure means for providing said reference pressure, said reference pressure means having an enclosure positioned within said liquid nitrogen, an adsorbing means for adsorbing gases within said enclosure, and pumping means for removing gases from said enclosure and said adsorbing means.

17. The apparatus of claim 14 including a container means positioned in said liquid nitrogen, a predetermined quantity of a gas in said container means, and means responsive to the pressure of said gas for continuously indicating the temperature of said liquid nitrogen as indicated by the pressure of said gas.

18. The apparatus of claim 14 in which said storage means is a closed container and in which said transfer means increases the pressure of a second gas above liquid nitrogen in said storage means to cause liquid nitrogen to pass from said storage means to said vessel.

19. The apparatus of claim 14 including closing means response to said operation control means for selectively closing said vessel with said sample flask within said vessel.

20. The apparatus of claim 1 including a valve means operative to provide said increments of gas, said valve means being made selectively operative or inoperative in response to corresponding distinct electrical pulses provided by said operation control means, and said valve means being maintained operative or inoperative between said electrical pulses by position maintaining means.

21. The apparatus of claim 20 in which said valve means includes a plunger having a lower end movable within a cavity which is formed in a base and which is continuous with two gas passages formed in said base, said lower end being positioned to close one of gas passages when said valve means is inoperative.

22. The apparatus of claim 21 including gas flow restricting means positioned in one of said gas passages to restrict the rate of flow of a gas through said gas passage.

23. The apparatus of claim 22 wherein said flow restricting means is positioned to be in proximate contact relation with said lower end when said one gas passage is blocked.

24. The apparatus of claim 20 in which said valve means is one of a plurality of valve means which are operative to control the flow of said gas through a plurality of passages and in which all of said plurality of passages are formed in a single metal block.

25. The apparatus of claim 1 in which said increments of gas flow through a passage formed in a block of metal maintained at a predetermined temperature by a heating means.

26. The apparatus of claim 1 in which said operation control means is responsive to a power means being operative and including means responsive to said power means becoming inoperative for causing said operation control means to become inoperative until said power means is again operative.

27. The apparatus of claim 1 in which said operation control means includes a programmed computer.

28. The method of analyzing a characteristic of a sample of porous material, comprising the steps of:
placing the sample material in a receptacle;
evacuating the atmosphere in the receptacle;
subsequently establishing in said receptacle a first amount of a gas which is adsorbed or desorbed by the sample material;
determining the amount of said first amount of gas which was adsorbed or desorbed by the sample material; and then
establishing in said receptacle a second amount of said gas which is determined by the extent of said determined amount of adsorption or desorption or said first amount of gas; and then
determining the amount of said second amount of gas which was adsorbed or desorbed by the sample material.

29. The method of claim 28, wherein said second amount of gas is directly proportional to the extent of difference of adsorption or desorption of said first amount of gas and a certain desired amount of adsorption or desorption.

30. The method of claim 28, wherein:
said step of establishing a first amount of gas comprises the steps of establishing an initial predetermined pressure of said gas in a measuring volume selectively isolated from said receptacle; and then establishing gas flow communication between said measuring volume and said receptacle; and then determining a first equilibrium pressure attained in said measuring volume and said receptacle;
said step of establishing a second amount of gas comprises the steps of initially establishing a second predetermined pressure of said gas in said selectively isolated measuring volume, said second predetermined pressure determined as a function of the extent by which said first equilibrium pressure differs from a certain desired equilibrium pressure; and then
establishing gas flow communication between said measuring volume and said receptacle; and then
determining a second equilibrium pressure attained in said measuring volume and said receptacle; and maintaining said measuring volume at a constant predetermined temperature during all of the foregoing steps.

31. The method of analyzing a characteristic of a sample of porous material, comprising the steps of:
placing the sample material in a receptacle;
evacuating the atmosphere in the receptacle;
subsequently establishing in said receptacle a first amount of a gas which is adsorbed or desorbed by the sample material;
determining the amount of said first amount of gas which was adsorbed or desorbed by the sample material; and then
establishing in said receptacle a second amount of said gas which differs from said first amount by an increment which is determined by the extent of difference between said determined amount of adsorption or desorption and a certain desired amount of adsorption or desorption;
said step of establishing a first amount of gas comprising the steps of establishing an initial predetermined pressure of said gas in a measuring volume selectively isolated from said receptacle; and then establishing gas flow communication between said measuring volume and said receptacle; and then
determining the equilibrium pressure attained in said measuring volume and said receptacle;
said step of establishing a second amount of gas comprising the steps of initially establishing a second predetermined pressure of said gas in said selectively isolated measuring volume; and then
establishing gas flow communication between said measuring volume and said receptacle; and then
determining the equilibrium pressure attained in said measuring volume and said receptacle; and
maintaining said measuring volume at a constant predetermined temperature during all of the foregoing steps, and further comprising the steps of
initially determining the volume of said receptacle which remains unoccupied by the sample material; and then
establishing said initial pressure of said gas in said measuring volume at a pressure which subsequently changes the volume of said gas in said receptacle by an amount equal to said unoccupied volume plus a certain percentage of the unoccupied volume; and then
establishing said second predetermined pressure of said gas in said measuring volume at a pressure which subsequently changes the gas pressure in said receptacle by an amount equal to a certain desired pressure plus an amount directly proportional to the portion of said first amount of gas which was adsorbed or desorbed by the sample material.

32. The method of analyzing a characteristic of a sample of porous material, comprising the steps of:
placing the sample material in a receptacle;
evacuating the atmosphere in the receptacle;
subsequently establishing in said receptacle a first amount of a gas which is adsorbed or desorbed by the sample material;
determining the amount of said first amount of gas which was adsorbed or desorbed by the sample material; and then
establishing in said receptacle a second amount of said gas which differs from said first amount by an increment which is determined by the extent of difference between said determined amount of adsorption or desorption and a certain desired amount of adsorption or desorption; and wherein each step of determining the equilibrium pressure comprises the steps of
measuring the pressure of gas within said communicated measuring volume and said receptacle a plurality of times;
determining when the rate of change of measured pressure is a certain predetermined rate; and
determining as said equilibrium pressure the said measured pressure corresponding to the time when said predetermined rate change is determined.

33. The method of claim 32, wherein said predetermined rate of change of measured pressure is substantially zero.

34. In an apparatus for selectively indicating the surface area and the pore volume distribution of a sample of porous material in a sample flask in response to the quantity of gas adsorbed or desorbed by the sample when the sample and the gas are at a predetermined temperature in the sample flask and the gas is at a predetermined pressure in the sample flask;
temperature control means for maintaining a sample flask and a sample and a gas within said sample flask at a predetermined temperature;
means defining a measuring volume for receiving a quantity of said gas;
evacuation means;
first valve means connected in fluid flow circuit between said measuring volume and said evacuation means;
second valve means connected in fluid flow circuit between said measuring volume and the sample flask;
third valve means connected in fluid flow circuit between said measuring volume and a source of said adsorbable or desorbable gas;
means maintaining said measuring volume, said first valve means, said second valve means, and said third valve means at a constant predetermined temperature;
operation control means operatively connected with said first, second, and third valve means and operative to change the quantity of said gas within said sample flask by successively operating said first or third valve means to provide an initial incremental pressure differential within said measuring volume and by then opening said second valve means to communicate such initial incremental pressure differential with said sample flask;
pressure responsive means operative to measure the equilibrium pressure of gas within said sample flask after said communication of said initial incremental pressure differential;
said operation control means being responsive to said measured pressure and also to a predetermined desired pressure to provide at least one subsequent incremental pressure differential of gas within said measuring volume, and to communicate said subsequent incremental pressure differential with said measuring flask;
the amount of said subsequent increment being proportional to the amount of difference between said measured pressure and said predetermined desired pressure and the total of all of said increments being sufficiently large to cause said gas within said sample flask to be at said predetermined desired pressure; and
indicating means responsive to said measured pressures of all of said increments of gas for selectively indicating the surface area and the pore volume distribution of said sample.

35. The apparatus of claim 34, wherein said means defining a measuring volume comprises a block of metal having a passage formed within, and means operative to maintain said block of metal at said fixed predetermined temperature.

36. The apparatus of claim 34, wherein each of said valve means comprises:
an annular valve seat surrounding a valve orifice;
housing means enclosing a volume on a first side of said valve seat except for a valve member passageway positioned in spaced apart aligned relation with said valve seat;
a valve closure member extending through said valve member passageway in fluid tight sealing relation with said housing means for reciprocal movement into and out of sealing contact with said annular valve seat;
means selectively operative in response to said operation control means to impart only reciprocal movement to said valve closure member;
a first passage communicating with said first side of said valve seat; and
a second passage communicating with said valve orifice.

37. Apparatus as in claim 36, further comprising flow restricting means disposed in the second passage of said third sample valve closely proximate to the location of said sealing contact between said annular valve seat and said valve closure member.

38. Apparatus as in claim 34, wherein said pressure responsive means is responsive to the rate of change of gas pressure to provide said measurement of equilibrium pressure when said rate of change is a predetermined rate of change.

* * * * *